(12) United States Patent
DeSanti

(10) Patent No.: US 10,055,241 B1
(45) Date of Patent: Aug. 21, 2018

(54) VIRTUAL MACHINE AWARE FIBRE CHANNEL

(71) Applicant: Cisco Technology, Inc., San Jose, CA (US)

(72) Inventor: Claudio DeSanti, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 14/845,628

(22) Filed: Sep. 4, 2015

(51) Int. Cl.
*G06F 15/16* (2006.01)
*G06F 9/455* (2018.01)

(52) U.S. Cl.
CPC ............ *G06F 9/45558* (2013.01); *G06F 2009/45579* (2013.01)

(58) Field of Classification Search
CPC .................. G06F 9/45558; G06F 2009/45579
USPC ........................................................ 709/245
See application file for complete search history.

(56) References Cited

U.S. PATENT DOCUMENTS

| 9,733,962 | B2* | 8/2017 | Buragohain | ........ G06F 9/45558 |
| 2010/0115132 | A1* | 5/2010 | Hirata | ................... H04L 12/413 709/245 |
| 2011/0022694 | A1* | 1/2011 | Dalal | ................. H04L 41/0843 709/222 |
| 2011/0029973 | A1 | 2/2011 | Hara et al. | |
| 2011/0173608 | A1 | 7/2011 | Buragohain et al. | |
| 2011/0173609 | A1* | 7/2011 | Buragohain | ........ G06F 9/45558 718/1 |
| 2012/0177041 | A1* | 7/2012 | Berman | ............... H04L 12/4625 370/392 |
| 2014/0092898 | A1* | 4/2014 | Berman | ............... H04L 12/4625 370/359 |
| 2015/0007180 | A1 | 1/2015 | Sharp et al. | |
| 2015/0180773 | A1* | 6/2015 | DeCusatis | ........... H04L 12/4641 370/392 |
| 2015/0188730 | A1 | 7/2015 | Iwata | |

(Continued)

OTHER PUBLICATIONS

VMware, May 5, 2013, "Ports in Fibre Channel SAN", retrieved via URL: https://docs.vmware.com/en/VMware-vSphere/5.5/com. vmware.vsphere.storage.doc/GUID-83440634-62AC-414B-B2C1-9EB922B1B58D.html.*

(Continued)

*Primary Examiner* — Anthony Mejia
*Assistant Examiner* — Schquita Goodwin
(74) *Attorney, Agent, or Firm* — Edell, Shapiro & Finnan, LLC

(57) ABSTRACT

A Hypervisor hosted on a computer device includes a Fiber Channel (FC) port to communicate with an FC switch in an FC switched fabric. The FC port has a port identifier assigned by the switch device. The Hypervisor solicits from the switch FC priority values available to be allocated as respective local identifiers of virtual machines (VMs). The Hypervisor instantiates a VM with a global VM identifier, and allocates one of the solicited priority values to the instantiated VM such that the allocated priority value and the port identifier together represent a fabric VM identifier. After the allocating, the Hypervisor sends to the FC switch an update frame to indicate the instantiated VM, the global VM identifier, and the fabric VM identifier. During an FC session, the Hypervisor exchanges FC frames with an FC destination port connected to the switched fabric. Each session frame indicates the fabric VM identifier.

22 Claims, 21 Drawing Sheets

(56) References Cited

U.S. PATENT DOCUMENTS

2015/0339180 A1\* 11/2015 Shih .................... G06F 11/0793
                                                                  714/49
2016/0246631 A1\*  8/2016 Tsirkin ................ G06F 9/45558
2016/0291997 A1\* 10/2016 Bernal ................ G06F 9/45558
2017/0054685 A1\*  2/2017 Malkov ............... H04L 63/0272

OTHER PUBLICATIONS

American National Standard of Accredited Standards Committee INCITS, Jun. 4, 2009, "Fibre Channel".\*
Howard L. Johnson et al., "FC-NWSG Virtual Machine Support", T11/15-209v0, Jun. 2015, 9 pages.

\* cited by examiner

| WORD | BITS 31..24 | 23..16 | 15..8 | 7..0 |
|---|---|---|---|---|
| 0 | R_CTL | D_ID | | |
| 1 | CS_CTL/PRIORITY | S_ID | | |
| 2 | TYPE | F_CTL | | |
| 3 | SEQ_ID | DF_CTL | SEQ_CNT | |
| 4 | OX_ID | | RX_ID | |
| 5 | PARAMETER | | | |

FIG.2

| PRIORITY VALUE | QoS PRIORITY | VM ID |
|---|---|---|
| 0 | NONE | NO |
| 1 .. 127 | NONE | YES |

| PRIORITY VALUE | QoS PRIORITY | VM ID |
|---|---|---|
| 0 | NONE | NO |
| 1 .. 96 | NONE | YES |
| 97 .. 127 | HIGH | YES |

| PRIORITY VALUE | QoS PRIORITY | VM ID |
|---|---|---|
| 0 | NONE | NO |
| 1 .. 31 | NONE | YES |
| 32 .. 63 | LOW | YES |
| 64 .. 95 | MEDIUM | YES |
| 96 .. 127 | HIGH | YES |

| PRIORITY VALUE | QoS PRIORITY | VM ID |
|---|---|---|
| 0 | NONE | NO |
| 1..79 | NONE | YES |
| 80..95 | LOW | YES |
| 96..111 | MEDIUM | YES |
| 112..127 | HIGH | YES |

| MAPPING DATABASE 700 | | |
|---|---|---|
| GLOBAL VM ID | FABRIC VM ID | |
| UUID #1 | N_PORT_ID #1 | PRIORITY #1 |
| UUID #2 | N_PORT_ID #2 | PRIORITY #2 |
| ... | | |
| UUID #n | N_PORT_ID #n | PRIORITY #n |

FIG.7

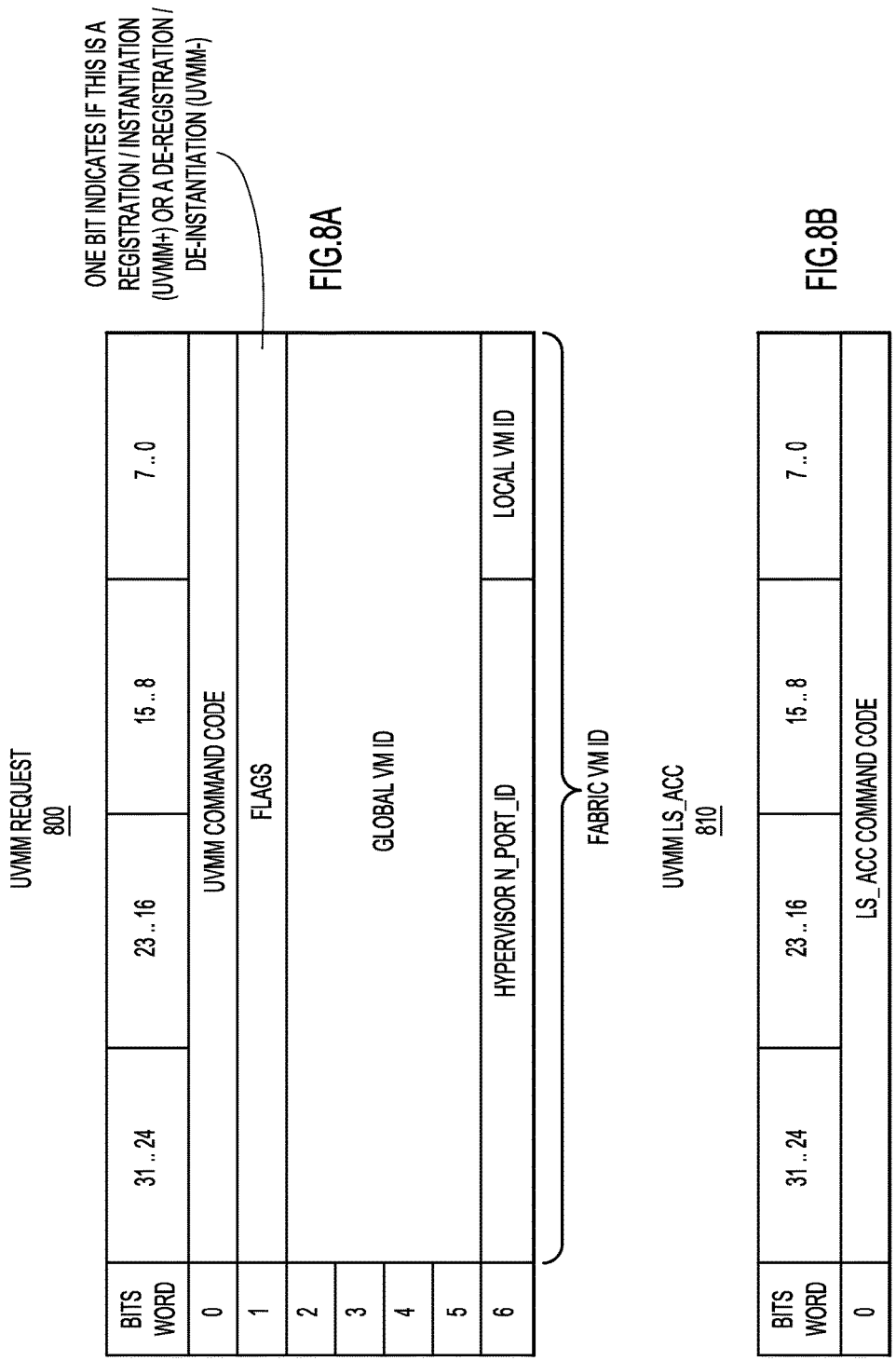

QFPA REQUEST
820

| BITS WORD | 31..24 | 23..16 | 15..8 | 7..0 |
|---|---|---|---|---|
| 0 | | QFPA COMMAND CODE | | |

FIG.8C

QFPA LS_ACC
830

| BITS WORD | 31..24 | 23..16 | 15..8 | 7..0 |
|---|---|---|---|---|
| 0 | | LS_ACC COMMAND CODE | | |
| 1 | RESERVED | PRIORITY VALUE 0 | QoS PRIORITY | VM ID (YES/NO) |
| 2 | RESERVED | PRIORITY VALUE 1 | QoS PRIORITY | VM ID (YES/NO) |
| 3 | RESERVED | PRIORITY VALUE 2 | QoS PRIORITY | VM ID (YES/NO) |
| ... | | | | |
| 127 | RESERVED | PRIORITY VALUE 127 | QoS PRIORITY | VM ID (YES/NO) |

FIG.8D

VIRTUAL MACHINE AWARE FIBRE CHANNEL

TECHNICAL FIELD

The present disclosure relates to virtual machines in Fibre Channel environments.

BACKGROUND

One virtualization model for Fibre Channel is referred to as a Fibre Channel-unaware virtual machine (VM) model. In this model, the Fibre Channel protocol is terminated within a Hypervisor and a VM instantiated on such Hypervisor is unaware that it is using Fibre Channel to access storage. For example, the Hypervisor may present to the VM a virtualized generic Small Computer System Interface (SCSI). In this model, the Hypervisor has visibility and control of input/output operations of the VM; however other important actors in a Storage Area Network (SAN) do not have such visibility. Such other actors include storage devices connected to a switched Fibre Channel fabric and the Fibre Channel switches composing the switched fabric. The other actors have no way to identify Fibre Channel traffic associated with a specific VM and are thus unable to assert VM specific access controls, and the like, which is disadvantageous.

BRIEF DESCRIPTION OF THE DRAWINGS

FIG. 2 is an illustration of a FC frame header that includes a variety of fields including a priority field used for local VM identifiers, according to an example embodiment.

FIG. 3 is an illustration of priority values that may be used or allocated as local VM identifiers in the priority field of the FC frame header of FIG. 2, according to an example embodiment.

FIG. 4 is an illustration of priority values that may be used or allocated as local VM identifiers in the priority field, according to another example embodiment.

FIG. 5 is an illustration of priority values that may be used or allocated as local VM identifiers in the priority field, according to yet another example embodiment.

FIG. 6 is an illustration of priority values that may be used or allocated as local VM identifiers in the priority field, according to an even further example embodiment.

FIG. 7 is an illustration of an example mapping database having mapping entries to map global VM identifiers to fabric VM identifiers (represented as {port identifier, priority value} pairs), according to an example embodiment.

FIG. 8A is an illustration of an Update VM Mappings (UVMM) Extended Link Service (ELS) Request sent by Hypervisors to a switched fabric in the environment of FIG. 1, according to an embodiment.

FIG. 8B is an illustration of a UVMM Link Service Accept (LS_ACC) ELS corresponding to the UVMM ELS of FIG. 8A and that sent from the switched fabric to the Hypervisors responsive to the UVMM ELS in the environment of FIG. 1, according to an embodiment.

FIG. 8C is an illustration of a Query Fabric Priority Allocation (QFPA) ELS Request sent by Hypervisors to the switched fabric in the environment of FIG. 1, according to an embodiment.

FIG. 8D is an illustration of a QFPA LS_ACC ELS corresponding to the QFPA ELS of FIG. 8C and that sent from the switched fabric to the Hypervisors responsive to the QFPA ELS in the environment of FIG. 1, according to an embodiment.

DESCRIPTION OF EXAMPLE EMBODIMENTS

Overview

A Hypervisor hosted on a computer device is configured with a Fibre Channel port to communicate with a Fibre Channel switch device in a Fibre Channel switched fabric. The Fibre Channel port has a port identifier assigned by the switch device. The Hypervisor identifies itself and each virtual machine (VM) instantiated on the Hypervisor with a unique global identifier (e.g., a Universally Unique Identifier (UUID)). At the Hypervisor, Fibre Channel priority values available to be allocated as respective local identifiers of VMs are queried from the switch device. A VM identified with a global VM identifier is instantiated on the Hypervisor. One of the queried priority values is allocated to the instantiated VM to identify the VM locally to the Hypervisor. Together, the allocated priority value and the Hypervisor's port identifier represent a fabric VM identifier. After the allocation, an update frame is sent to the switch device including the global VM identifier and the fabric VM identifier (represented by the {port identifier, priority value} pair) to indicate an association between the global VM identifier and the fabric VM identifier. During a Fibre Channel session, Fibre Channel frames are exchanged with a Fibre Channel destination port connected to the switched fabric. Each of the Fibre Channel frames can be specifically associated to the VM through the fabric VM identifier (i.e., the port identifier identifying the Hypervisor and the priority value identifying the VM on that Hypervisor).

Example Embodiments

Figure 1:
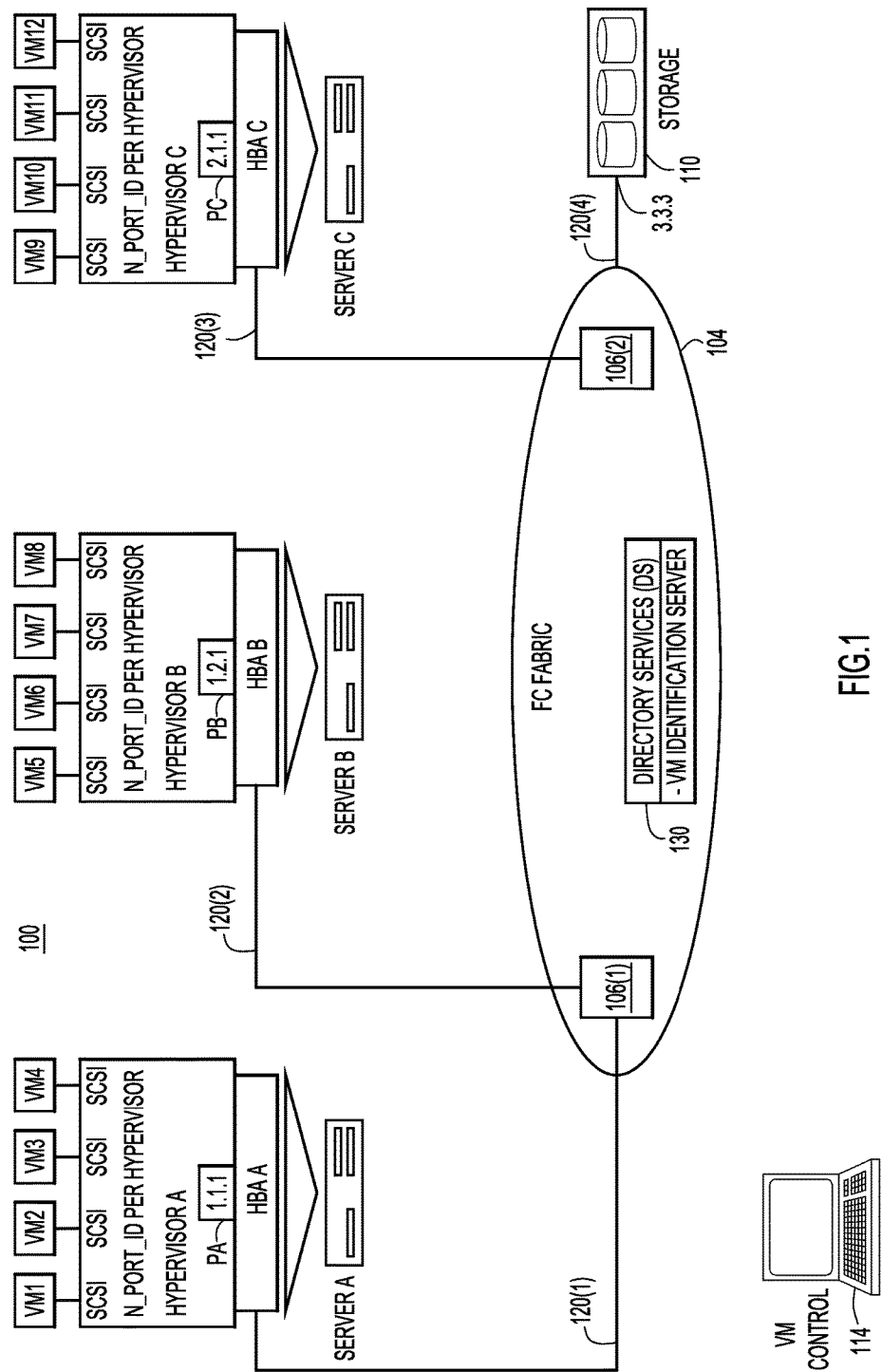
FIG. 1 is a block diagram of a virtual machine (VM) aware Fibre Channel (FC) environment, according to an example embodiment.

With reference to FIG. 1, there is a block diagram of an example virtual machine aware Fibre Channel (FC) environment 100 in which virtual machine aware FC embodiments presented herein may be implemented. Environment 100 includes an FC switched fabric 104 including interconnected FC switch devices 106(1) and 106(2) (referred to as "fabric switches"), distributed computer servers A-C (also referred to as "servers"), a memory storage resource or device 110, and a management entity 114 referred to as "VM Control" through which a user and/or an automation tool manages deployment of virtual machines (VMs) in environment 100. Servers A and B communicate with fabric switch 106(1) over respective FC connections or links 120(1) and 120(2), server C communicates with fabric switch 106(2) over an FC connection 120(3), and storage device 110 communicates with switched fabric 104 over FC connection 120(4). Switch fabric 104 provides a Directory Service (DS) 130 implemented as a distributed service across its switches and that manages/maintains various databases accessible to fabric switches 106. Directory Service 130 includes a VM Identification server to assist with managing the virtualization specific database, as will be described below. Environment 100 is depicted in FIG. 1 by way of example only and may include more or less servers, fabric switches, and storage devices than those shown.

In the example of FIG. 1, servers A-C are configured and operate similarly to each other. Therefore, the ensuing description of server A shall suffice for similarly configured servers B and C. Server A includes a respective host bus adapter A (HBA A) to support FC connection 120(1) between the server and fabric switch 106(1). In addition, server A hosts a respective Hypervisor, Hypervisor A, to host or support multiple VMs VM1-VM4 instantiated on the Hypervisor. The term "instantiated" may be used synonymously and interchangeably with the term "installed," "deployed," "executed," and "provisioned."

Hypervisor A is configured with or implements and presents a virtualized Small Computer System Interface (SCSI) to each of VMs VM1-VM4, and accesses an FC N_Port PA having one or more global or world wide N_Port_Names associated therewith, and an N_Port identifier (N_Port_ID) 1.1.1 assigned thereto by switched fabric 104 during an FC fabric login (FLOGI) procedure or transaction, as it is known. Storage device 110 also includes an N_Port (not explicitly shown in FIG. 1) having an N_Port_ID 3.3.3 assigned thereto by switched fabric 104 during a FLOGI procedure. Hypervisor N_Port PA communicates with each of the virtualized SCSI interfaces, and also with fabric switch 106(1) over FC connection 120(1), and thus enables VMs VM1-VM4 to communicate with switched fabric 104 via the respective virtualized SCSI interfaces, N_Port PA, and FC connection 120(1).

Similar to server A, servers B and C host respective Hypervisors, Hypervisor B and Hypervisor C, which in turn have instantiated thereon respective sets of virtual machines VM5-VM8 and VM9-VM12. Hypervisors B and C access respective FC N_Ports, N_Ports PB and PC, having respective global N_Port_Names associated therewith and respective N_Port_IDs 1.2.1 and 2.1.1 assigned thereto by switched fabric 104 during respective FLOGI procedures. Hypervisors A-C exchange FC data frames and FC control frames with switched fabric 104 via respective Hypervisor N_Ports PA-PC. Such FC frames may be exchanged between Hypervisors A-C and switched fabric 104 on behalf of the VMs VM1-VM12, for example, when the VMs communicate with storage device 110. FIG. 1 shows environment 100 at a time/state when VMs VM1-VM12 are hosted across Hypervisors A-C. More or less VMs may be hosted across Hypervisors A-C at any given time as VMs become instantiated on or de-instantiated from the Hypervisors.

Management entity 114 controls the deployment of VMs across Hypervisors A-C. To do this, management entity 114 may issue commands to (i) instantiate a VM on a given Hypervisor, which results in the instantiation of the VM on that Hypervisor, (ii) remove or de-instantiate a VM from the given Hypervisor on which the VM was already instantiated, which results in a de-instantiation of the VM from the given Hypervisor, and (iii) move the instantiated VM from the given Hypervisor to a destination Hypervisor, which results in de-instantiation of the VM from the given Hypervisor and instantiation of the moved VM on the destination Hypervisor.

As mentioned above, Hypervisors A-C exchange FC frames with FC switched fabric 104 on behalf of respective groups of VMs VM1-VM4, VM5-VM8, and VM9-VM12. Each of the exchanged FC frames includes an FC frame header. The FC frame header includes a variety of control fields, and a payload for other information. According to embodiments presented herein, a priority field of the FC frame header of each FC frame exchanged on behalf of a given VM is populated with a priority value that identifies the VM locally to a Hypervisor on which the VM is instantiated. In other words, the priority value serves as a VM ID locally to the Hypervisor. Thus, in the ensuing description, the "priority value" is referred to synonymously and interchangeably as the "local VM ID". Together with the Hypervisor port identifier (N_Port_ID), the priority value (i.e., local VM ID) in an FC frame identifies the VM associated with the FC frame to fabric switches 106 in switched fabric 104 that route the FC frame through the switched fabric to and from destination devices, such as storage device 110. The local VM ID and Hypervisor N_Port_ID also identify that VM to storage device 110. The VM associated with the FC frame may be a source VM that originates information included in the FC frame or a destination VM that is a destination of the information included in the FC frame. Accordingly, the local VM ID in the FC frame associates the FC frame with the VM that is the source or the destination of the FC frame and thus renders switched fabric 104 and storage device "aware" of that association. Hence, environment 100 is referred to as a "VM aware Fibre Channel environment."

The local VM ID may also indicate a priority level associated with the FC frame, such as a Quality-of-Service (QoS) priority level associated with a FC session during which the FC frame is being exchanged. FC switches 106 in FC switched fabric 104 that route the FC frame, and storage device 110 may handle the FC frame in accordance with the QoS priority level indicated by or associated with the local VM ID.

VM aware FC environment 100 uses, in various VM aware FC environment scenarios described below, new features, including new Extended Link Services (ELSs) or Common Transport Commands (i.e., control plane messages), and a new mapping database. First, the new features will be described in connection with FIGS. 2-8. Then, the various scenarios that use those features will be described in connection with FIGS. 9-17.

With reference to FIG. 2, there is an illustration of an example FC frame header 200 that includes a variety of fields defined according to known FC standards, extended or modified according to the embodiments presented herein. In accordance with those embodiments, a CS_CTL/Priority field (also referred to more simply as "Priority") is populated with a priority value that represents a local VM ID (or VM tag) having characteristics and uses described more fully below. The FC frame header 200 also includes a D_ID field populated with an N_Port_ID of an N_Port that is a destination of the FC frame, and an S_ID field populated with an N_Port_ID of an N_Port that is a source or originator of the FC frame. The triplet of IDs D_ID, S_ID, and Priority in FC frame header 200 uniquely identifies FC frames or traffic associated with a specific VM, e.g., one of VMs VM1-VM12. Using the priority value (i.e., local VM ID), storage device 110 and switched fabric 104 are able to associate the traffic with the specific VM and enforce appropriate access controls, including VM zoning across Hypervisors. FC header 200 also include the following fields defined according to known FC standards: routing control R_CTL, frame control F_CTL, data structure type Type, sequence ID SEQ_ID, optional header in data field DF_CTL, sequence count SEQ_CNT, originator exchange ID OX_ID, and responder exchange ID RX_ID, and frame type dependent parameters.

With reference to FIG. 3, there is an illustration of a table 300 of priority values that may be used or allocated as local VM IDs in the Priority field of FC frame header 200, according to an embodiment. Each row of Table 300 lists (i) one or more priority values (e.g., 0 or 1 . . . 127) in a left column labeled Priority Value, (ii) a QoS priority level associated with the priority values for that row in a middle column labeled QoS Priority, and (iii) an indicator as to whether the priority values may or may not be used as local VM IDs in a right column. Given that multiple (different) priority values may corresponding to a same QoS priority level, each of the multiple priority values may serve as an ID of a different VM.

With reference to FIG. 4, there is an illustration of a table 400 of ranges of priority value ranges that may be used or allocated as priority values (i.e., local VM IDs) in the Priority field of FC frame header 200, according to another embodiment. In table 400, priority values in the third row may serve as local VM identifiers that all have a same QoS priority level, (e.g., High).

With reference to FIG. 5, there is an illustration of a table 500 of priority values that may be used or allocated as local VM IDs in the Priority field of FC frame header 200, according to yet another embodiment.

With reference to FIG. 6, there is an illustration of a table 600 of priority values that may be used or allocated as local VM IDs in the Priority field of FC frame header 200, according to yet another embodiment.

Returning to FIG. 1, Directory Service 130 includes the VM Identification server to support the use of fabric VM IDs in environment 100. According to the embodiments presented herein, the VM Identification server maintains a mapping database (described below in connection with FIG. 7) having VM mapping entries each to map a unique global ID of a VM (also referred to herein as a "global VM ID") instantiated on a Hypervisor to (i) an N_Port_ID for an N_Port of that Hypervisor, and (ii) a priority value (i.e., local VM ID) that is allocated by the Hypervisor. In one example, the global VM ID may be a Universally Unique ID (UUID), such as a 16-byte UUID. Together, the N_Port_ID and the priority value (i.e., the local VM ID) identify an instantiated VM to switched fabric 104 and thus represent a "fabric VM ID" of the VM. Thus, each entry in the mapping database maps a global VM ID to a fabric VM ID (represented as a {N_Port_ID, local VM ID (i.e., priority value)} pair).

With reference to FIG. 7, there is an illustration of an example mapping database 700 having mapping entries corresponding to rows of the mapping database. As mentioned above, each mapping entry or row maps a global VM ID (e.g., UUID) to the fabric VM ID, (i.e., the Hypervisor N_Port_ID and the local VM ID (i.e., priority value) of a VM instantiated on the Hypervisor).

The embodiments presented herein also introduce new FC ELSs (i.e., FC control plane messages) to support the use and maintenance of the fabric VM IDs in environment 100. The new ELSs include an Update VM Mappings (UVMM) ELS and a Query Fabric Priority Allocation (QFPA) ELS. The UVMM ELS and QFPA ELS each have an associated Link Service Accept ELS referred to as an LS_ACC ELS. A given Hypervisor of Hypervisors A-C sends an appropriate UVMM ELS to switched fabric 104 and storage device 110 whenever a VM is instantiated on, de-instantiated from, or moved from the Hypervisor. The UVMM ELS indicates the local VM ID allocated to the VM by the given Hypervisor and that is subject to the instantiation, de-instantiation, or move action. Switch fabric 104 updates mapping database 700 based on the UVMM ELS to that the mapping database accurately reflects the impact of the instantiation, de-instantiation, or move action on the local VM ID indicated in the UVMM.

A given one of Hypervisors A-C sends a QFPA ELS to switched fabric 104 to query a list of priority values available to be allocated as local VM IDs of virtual machines (VMs) instantiated (or to be instantiated) on the Hypervisor. Switch fabric 104 sends the queried list to the requesting Hypervisor in an Accept (LS_ACC) of the QFPA ELS.

With reference to FIGS. 8A-8D there are illustrations of examples of the new ELSs mentioned above.

With reference to FIG. 8A, there is an illustration of an example UVMM ELS 800 (also referred to as a "UVMM Request" 800) sent by Hypervisors A-C to switched fabric 104.

ELS 800 includes a UVMM Command Code/type that indicates the UVMM ELS, and Flags to indicate whether ELS 800 is a UVMM+ELS used when a VM is instantiated or, alternatively, a UVMM-ELS used when a VM is de-instantiated. UVMM ELS 800 also includes a global VM ID (e.g., UUID), a Hypervisor N_Port_ID, and a local VM ID (i.e., priority value) as appropriate.

With reference to FIG. 8B, there is an illustration of an example UVMM LS_ACC ELS 810 corresponding to UVMM ELS 800 and that is sent as an Accept from switched fabric 104 to the one of Hypervisors A-C that sent UVMM 800. UVMM LS_ACC 810 includes an LS_ACC Command Code that identifies the UVMM LS_ACC ELS.

With reference to FIG. 8C, there is an illustration of an example QFPA ELS 820 (also referred to as a "QFPA Request" 820) sent by Hypervisors A-C to switched fabric 104 to solicit/request available priority values that may be allocated as local VM IDs to VMs instantiated on the Hypervisors. ELS 820 includes a QFPA Command Code/type that indicates the QFPA ELS.

With reference to FIG. 8D, there is an illustration of an example QFPA LS_ACC ELS 830 corresponding to QFPA ELS 820 and that is sent from switched fabric 104 as a response to the one of Hypervisors A-C that sent the QFPA ELS. QFPA LS_ACC 830 includes a QFPA LS_ACC Command Code that identifies the QFPA LS_ACC ELS. QFPA LS_ACC 830 also includes information from tables 300-600, for example, that indicates which priority values are available to be allocated as local VM IDs to VMs instantiated on Hypervisors A-C.

Various VM aware FC environment scenarios which use or prepare for the use of the above described features (e.g., the local VM IDs and FC frame header 200, mapping database 700, and QFPA and UVMM ELSs) are now described in connection with FIGS. 9-17. The scenarios are presented by way of example only. The time order in which the scenarios are implemented may be permuted. Also, more or less scenarios may be implemented.

Figure 9:
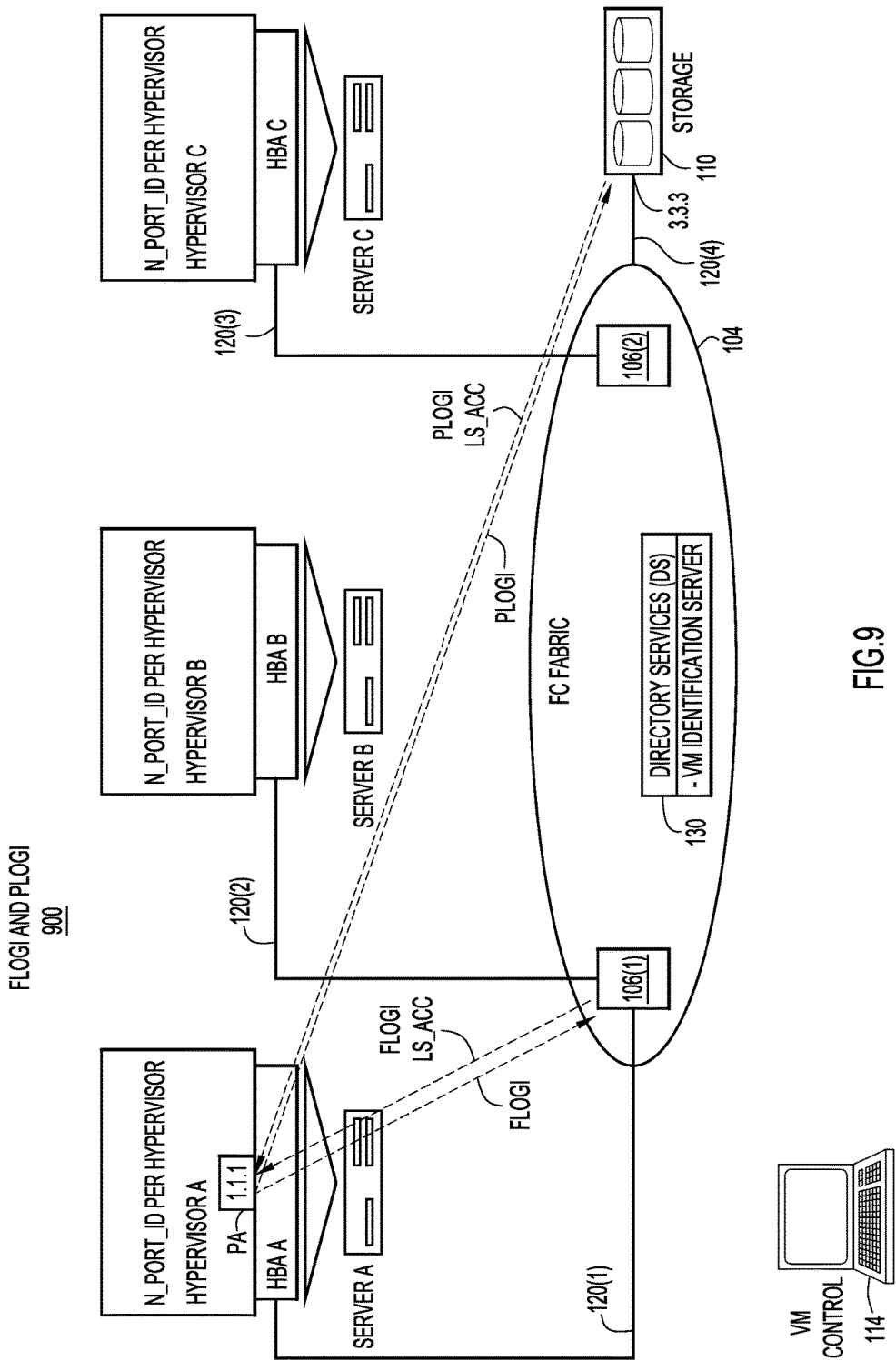
FIG. 9 is an illustration of a scenario in which FC fabric login (FLOGI) and port login (PLOGI) procedures are performed by a first Hypervisor in the environment of FIG. 1, according to an example embodiment.

With reference to FIG. 9, there is an illustration of an example scenario 900 in which initial FC fabric login (FLOGI) and port login (PLOGI) procedures are performed by Hypervisor A in environment 100. Hypervisor N_Port PA uses the FLOGI procedure or transaction to inform switched fabric 104 of its N_Port_Name and acquire its N_Port_ID from the switched fabric. To do this, Hypervisor N_Port PA sends to fabric switch 106(1) an FLOGI ELS including the N_Port_Name for the Hypervisor N_Port. Fabric switch 106(1) returns to Hypervisor N_Port PA a FLOGI LS_ACC that assigns N_Port_ID 1.1.1 to the N_Port. Sending of FC ELS frames are indicated as dashed arrow lines in FIG. 9 (and the other figures described below).

Then, Hypervisor N_Port PA performs the PLOGI procedure with discovered peer N_Ports, such as with an N_Port of storage device 110, in which the Hypervisor N_Port PA and the storage device N_Port exchange with each other parameters (such as their respective N_Port_IDs) needed to establish an FC session with each other. To do this, Hypervisor N_Port PA sends a PLOGI ELS to the N_Port of storage device 110 and receives a PLOGI LS_ACC from the storage device N_Port.

Figure 10:
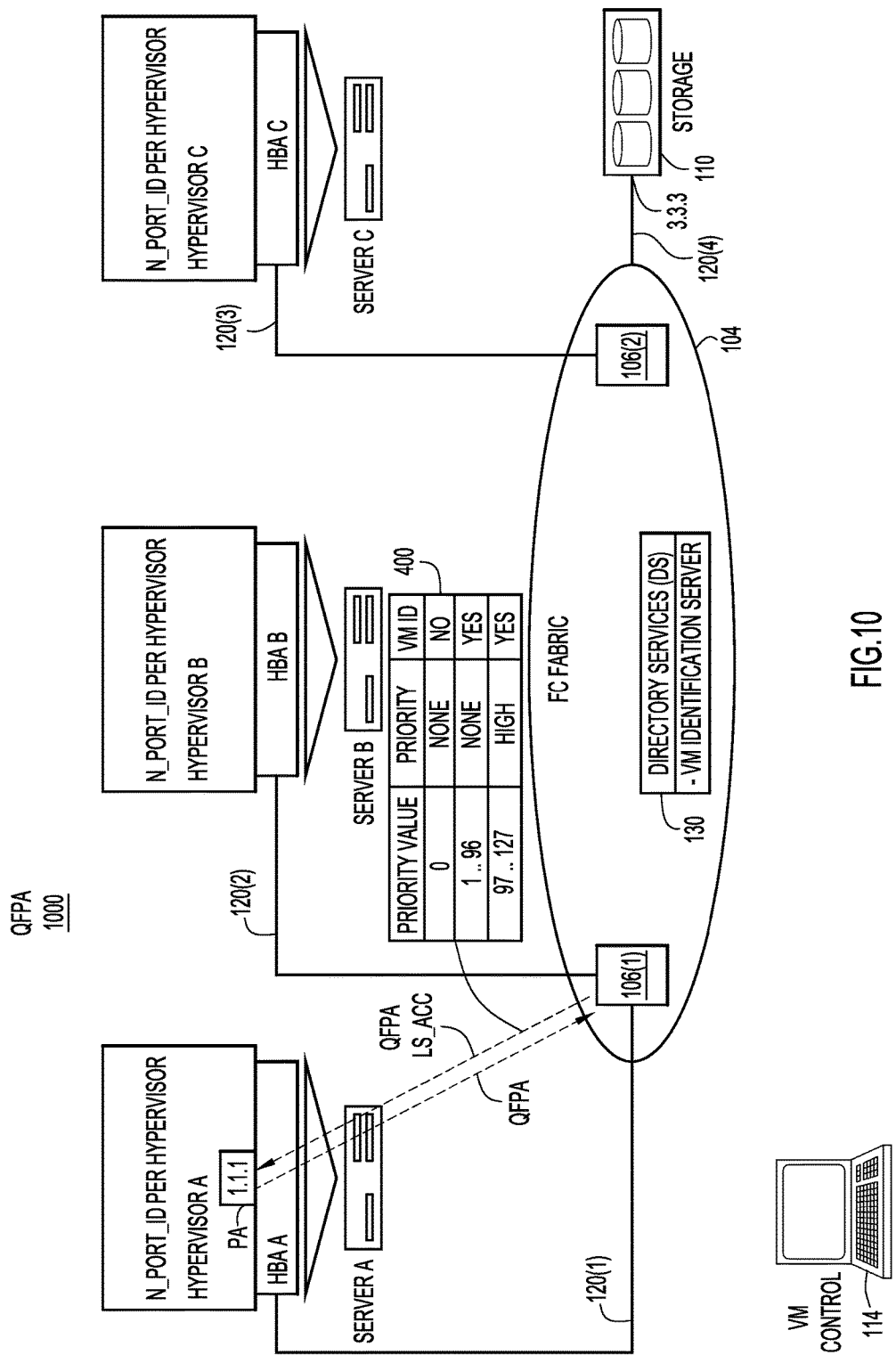
FIG. 10 is an illustration of a scenario performed in the environment of FIG. 1 in which the first Hypervisor queries the switched fabric for priority values to be used as local VM identifiers after the FOGI and PLOGI procedures of FIG. 9 have been completed, according to an example embodiment.

With reference to FIG. 10, there is an illustration of an example scenario 1000 in which Hypervisor A queries switched fabric 104 for priority values that are available to be allocated as local VM IDs, after the FOGI and PLOGI procedures have been completed. Hypervisor A sends a QFPA ELS to fabric switch 106(1) to solicit from the fabric switch a list of priority values available to be allocated as local VM IDs. In response, fabric switch 106(1) sends the current list and associated information to Hypervisor A in a QFPA LS_ACC. In the example of FIG. 10, the QFPA LS_ACC includes the priority values and related information included in table 400 (or any of tables 300-600).

Figure 11:
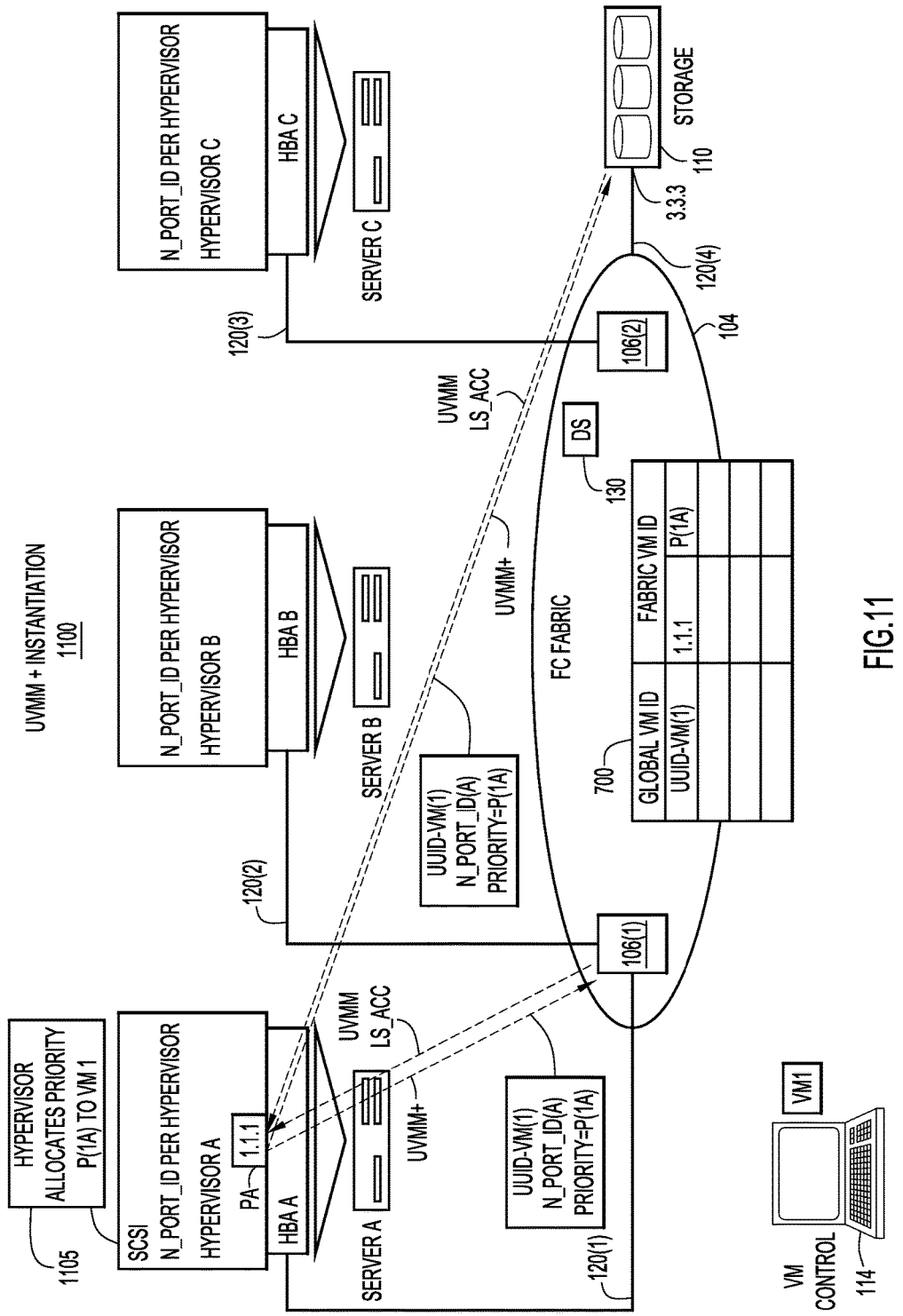
FIG. 11 is an illustration of a scenario in which the first Hypervisor instantiates a first VM in response to commands from a management entity, according to an example embodiment.

With reference to FIG. 11, there is an illustration of an example scenario 1100 in which Hypervisor A instantiates VM VM1 in response to commands from management entity 114. At 1105, Hypervisor A allocates one of the priority values listed in the QFPA LS_ACC (e.g., identified as priority value P(1A) in FIG. 11) from switched fabric 104 as a local VM ID of VM VM1. Hypervisor A also provides a virtualized SCSI interface thereon to communicate with VM VM1 once the VM is instantiated. Hypervisor A then sends a UVMM+ELS to fabric switch 106(1) informing the fabric switch of the global VM ID (e.g., UUID-VM(1)), the Hypervisor N_Port_ID (e.g., N_Port_ID(A), which is 1.1.1 in the example), and the allocated priority value (e.g., P(1A)) that is to serve as the local VM ID for VM VM1 and that is associated with the Hypervisor N_Port_ID. Together, the allocated priority/local VM ID (e.g., P(1A)) and the N_Port_ID (e.g., N_Port_ID(A)) represent the fabric VM ID (e.g., of VM1).

Responsive to the UVMM+ELS, fabric switch 106(1) responds with a UVMM LS_ACC to Hypervisor A. Fabric switch 106(1) also communicates the information contained in the UVMM+ELS to the VM Identification server of Directory Service 130. Based on the information in the UVMM+ELS, the VM Identification server adds a mapping entry to mapping database 700 that maps the global VM ID (e.g., UUID-VM(1)) to the fabric VM ID represented by the Hypervisor N_Port_ID (e.g., N_Port_ID(A), which is 1.1.1 in the example) and the priority value that serves as the local VM ID of VM 1 (e.g., P(1A)).

Hypervisor A also sends a UVMM+ELS to storage device 110. In response, storage device 110 updates a mapping database stored therein similar to mapping database 700, and sends a UVMM LS_ACC to Hypervisor A.

Figure 12:
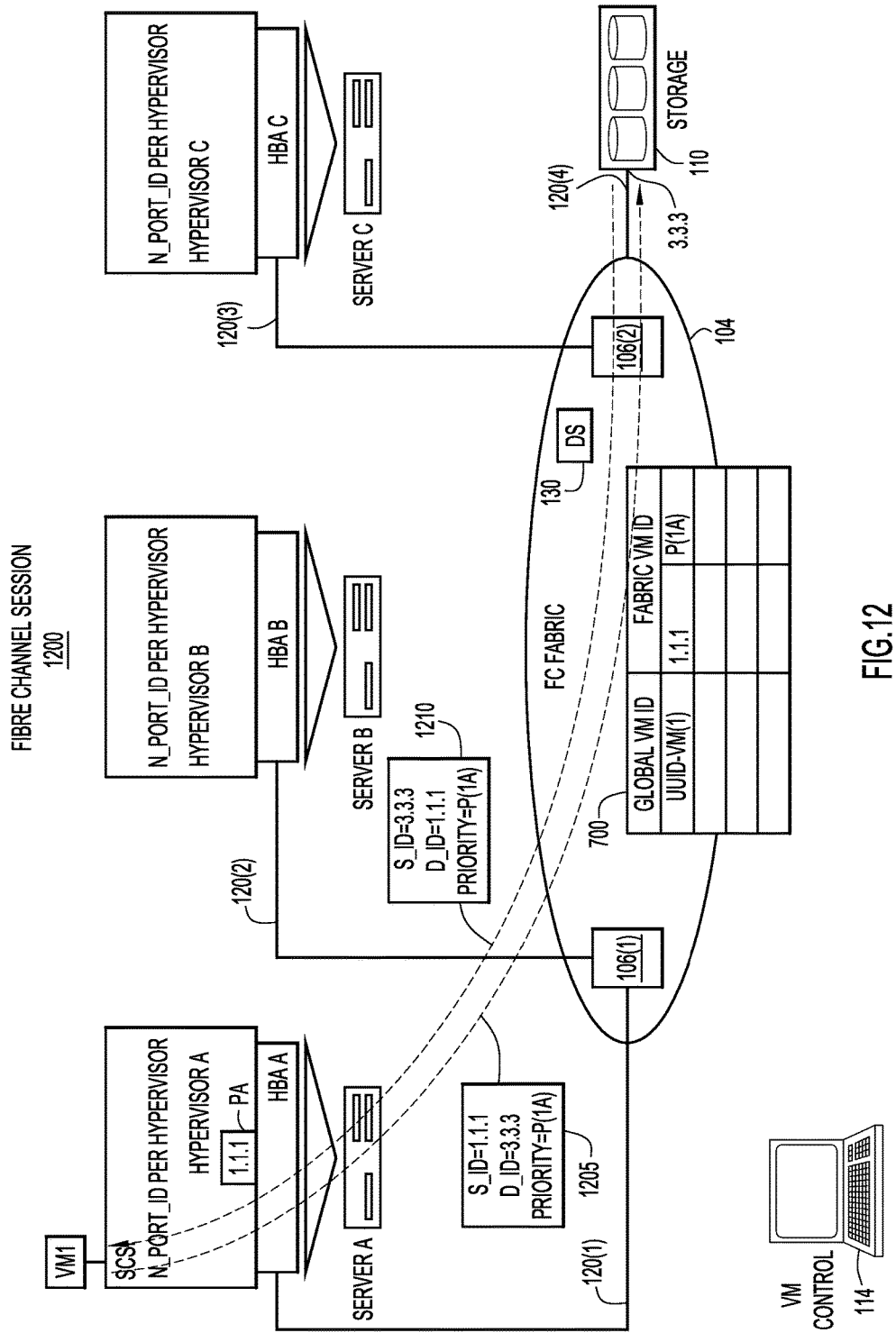
FIG. 12 is an illustration of a scenario in which the instantiated first VM has established an FC (communication) session with a storage device, according to an embodiment.

Hypervisor A instantiates VM VM1 on the Hypervisor (see FIG. 12.).

With reference to FIG. 12, there is an illustration of an example scenario 1200 in which VM VM1 instantiated on Hypervisor A based on the scenarios described above has established an FC (communication) session with storage device 110 and during which the VM communicates with the storage device to retrieve data from and store data to storage device 110, for example. During the session, Hypervisor N_Port PA and the N_Port of storage device 110 exchange FC frames (which comprise FC session traffic) with each other on behalf of VM VM1 and the storage device via switched fabric 104. Each FC frame sent from Hypervisor N_Port PA to the N_Port of storage device 110 includes an FC frame header 1205 (based on the format of FC frame header 200) that includes, in part, an S_ID field populated with Hypervisor N_Port PA N_Port_ID 1.1.1, a D_ID field populated with storage device N_Port N_Port_ID 3.3.3, and an Priority field populated with the allocated priority value P(1A) used as the local VM ID of VM VM1. Similarly, each FC frame sent in the reverse direction from the N_Port of storage device 110 to Hypervisor N_Port PA includes, in part, an FC frame header 1210 having an S_ID field populated with storage device N_Port_ID 3.3.3, a D_ID field populated with Hypervisor N_Port_ID 1.1.1, and a Priority field populated with the priority value P(1A) used as the local VM ID of VM VM1.

Figure 13:
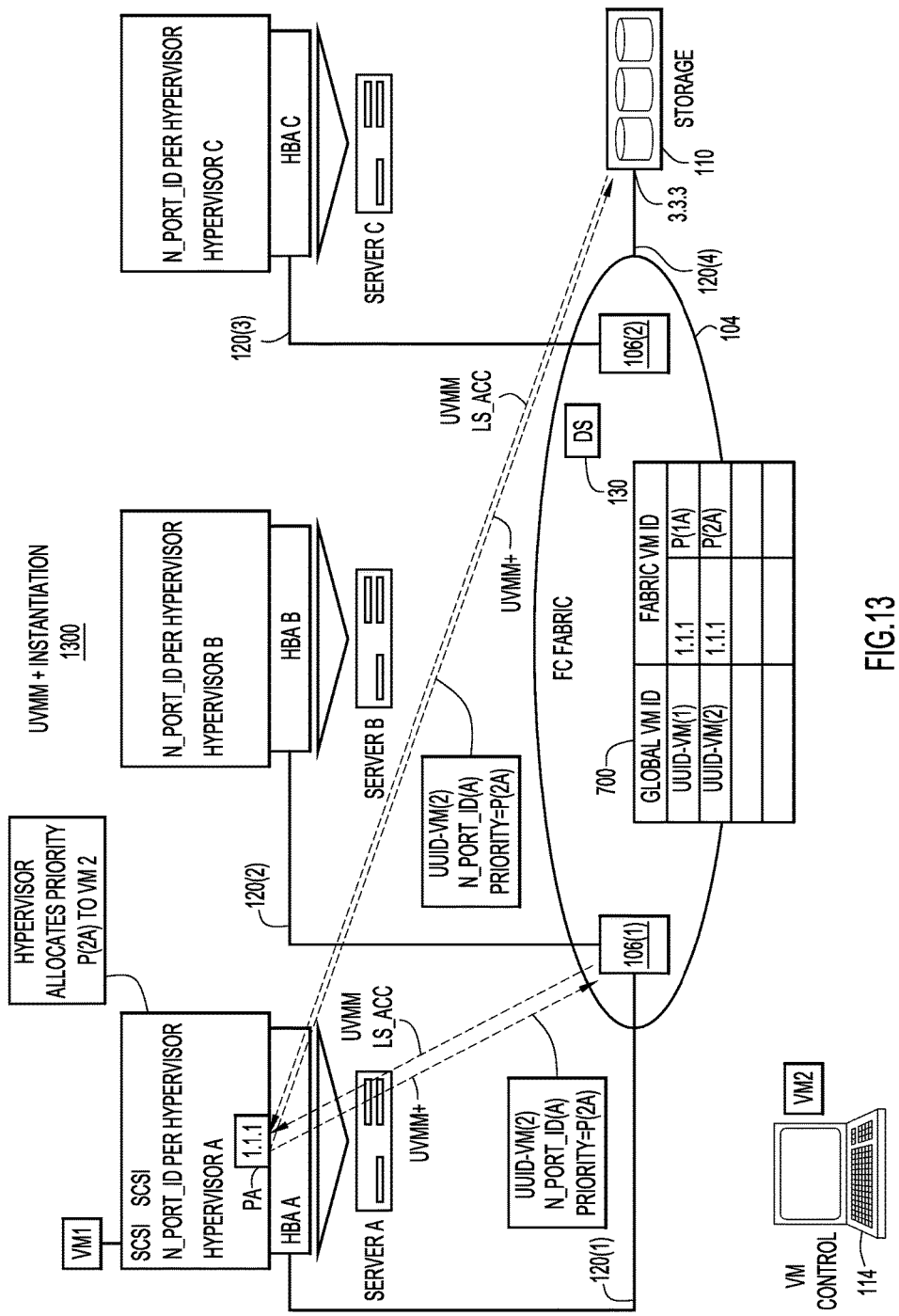
FIG. 13 is an illustration of a scenario in which a second VM is instantiated on the first Hypervisor, according to an example embodiment.

With reference to FIG. 13, there is an illustration of an example scenario 1300 in which a second VM, VM VM2, is instantiated on Hypervisor A responsive to commands from management entity 114. Similar to scenario 1100, Hypervisor A allocates from the list of available priority values received via the QFPA LS_ACC in scenario 1000 a priority value P(2A) as the local VM ID of VM VM2, and sends a UVMM+ELS to switched fabric 104 to indicate (i) the allocation of VM ID P(2A), the global VM ID UUID-VM(2), and the Hypervisor N_Port_ID N_Port_ID(2) (e.g., which is still 1.1.1 in the example). In response, switched fabric 104 adds to mapping database 700 a mapping entry 1310 that reflects the information in the UVMM+ELS. Hypervisor A also sends a similar UVMM+ to storage device 110 so that the storage device can update the mapping database stored therein.

Figure 14:
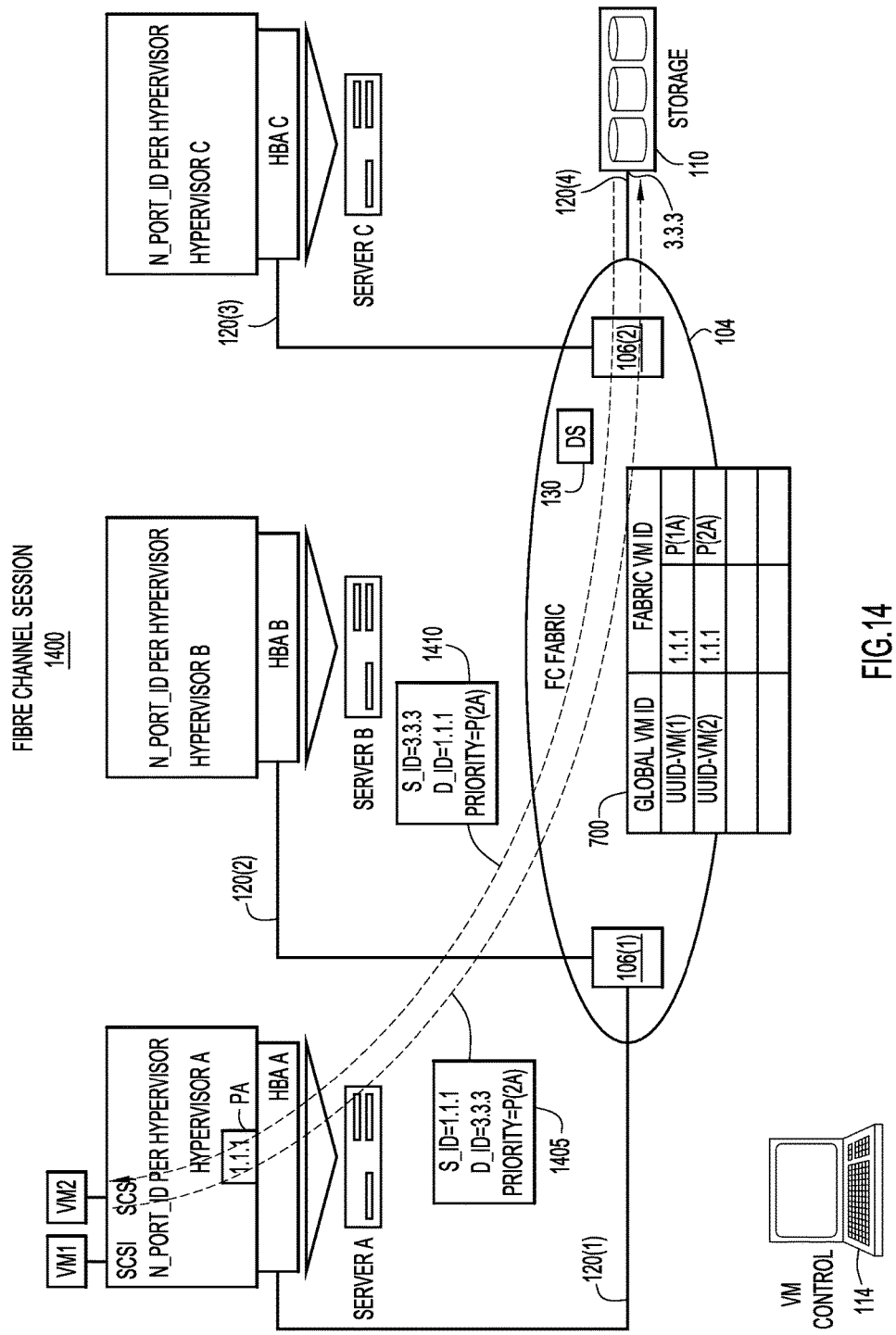
FIG. 14 is an illustration of a scenario in which the second VM has established an FC (communication) session with the storage device, according to an example embodiment.

With reference to FIG. 14, there is an illustration of an example scenario 1400 in which VM VM2 instantiated on Hypervisor A based on scenario 1300 has established an FC (communication) session with storage device 110 during which the VM communicates with the storage device. Similar to scenario 1200, during the session, Hypervisor A and storage device 110 exchange FC frames including headers 1405 and 1410 that include the local VM ID P(2A) for VM VM2.

Figure 15:
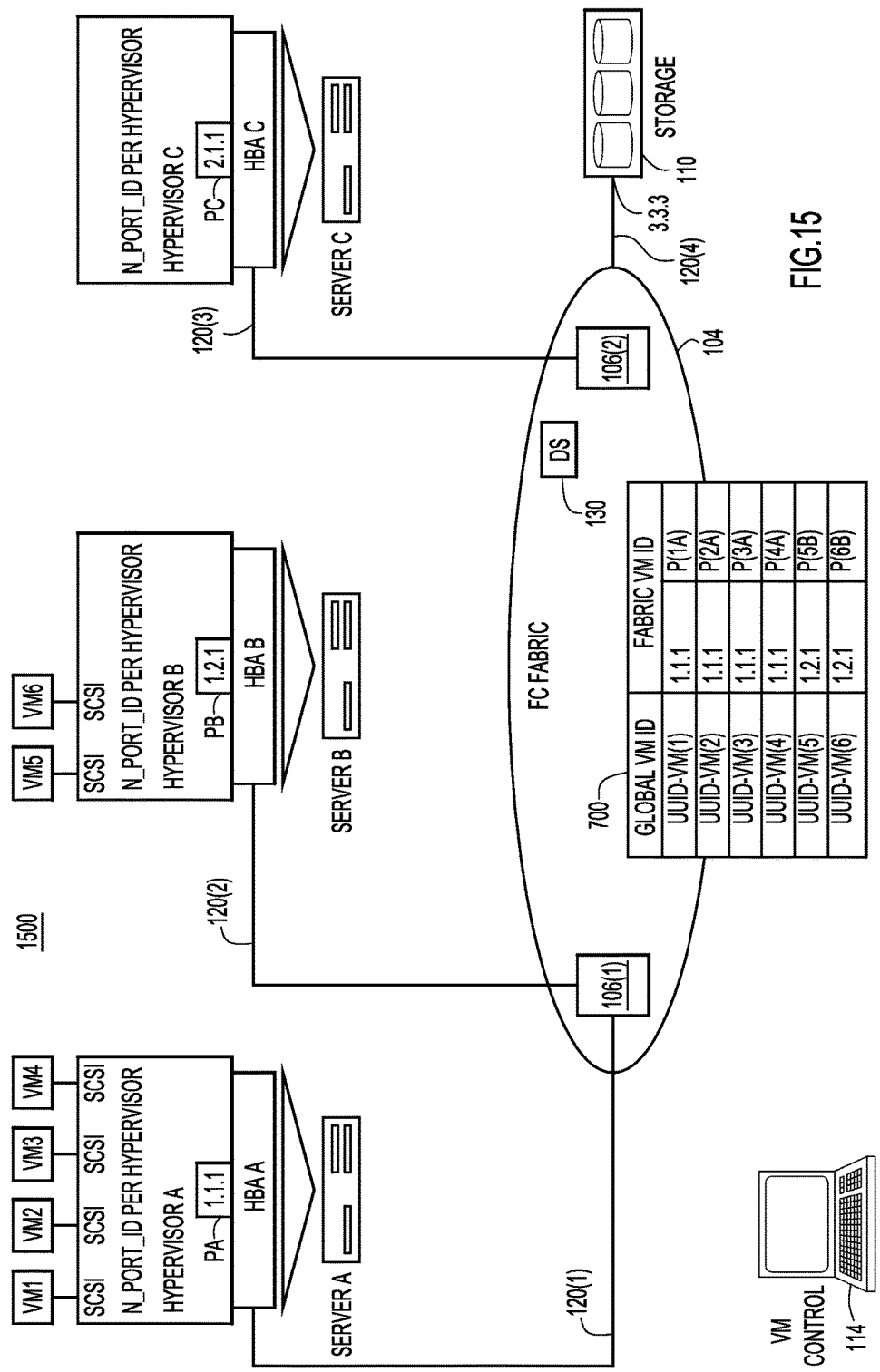
FIG. 15 is an illustration of a scenario in which additional VMs have been instantiated across the first Hypervisor and a second Hypervisor, according to an example embodiment.

With reference to FIG. 15, there is an illustration of an example scenario 1500 in which additional VMs VM3 and VM4 have been instantiated on Hypervisor A in the manner described above in connection with scenarios 1100 and 1300. Also in scenario 1500, Hypervisor B has (i) acquired its N_Port_ID 1.2.1 from switched fabric 104 using an FLOGI procedure similar to that described above in connection with scenario 900, (ii) received a list of priority values available to be allocated as local VM IDs via a QFPA ELS-LS_ACC transaction as described above in connection with scenario 1000, and (iii) instantiated VMs VM5-VM6 using the techniques described above in connection with scenarios 1100 and 1300. In the example of FIG. 15, mapping database 700 reflects the instantiation of VMs VM1-VM6 across Hypervisors A and B. Specifically, mapping database 700 includes mapping entries that map fabric VM IDs (i.e., the {N_Port_ID, Priority} pairs) of VMs VM1-VM6, respectively, to global VM IDs (e.g., UUIDs) of VM VM1-VM6, as indicated in FIG. 15.

Figure 16:
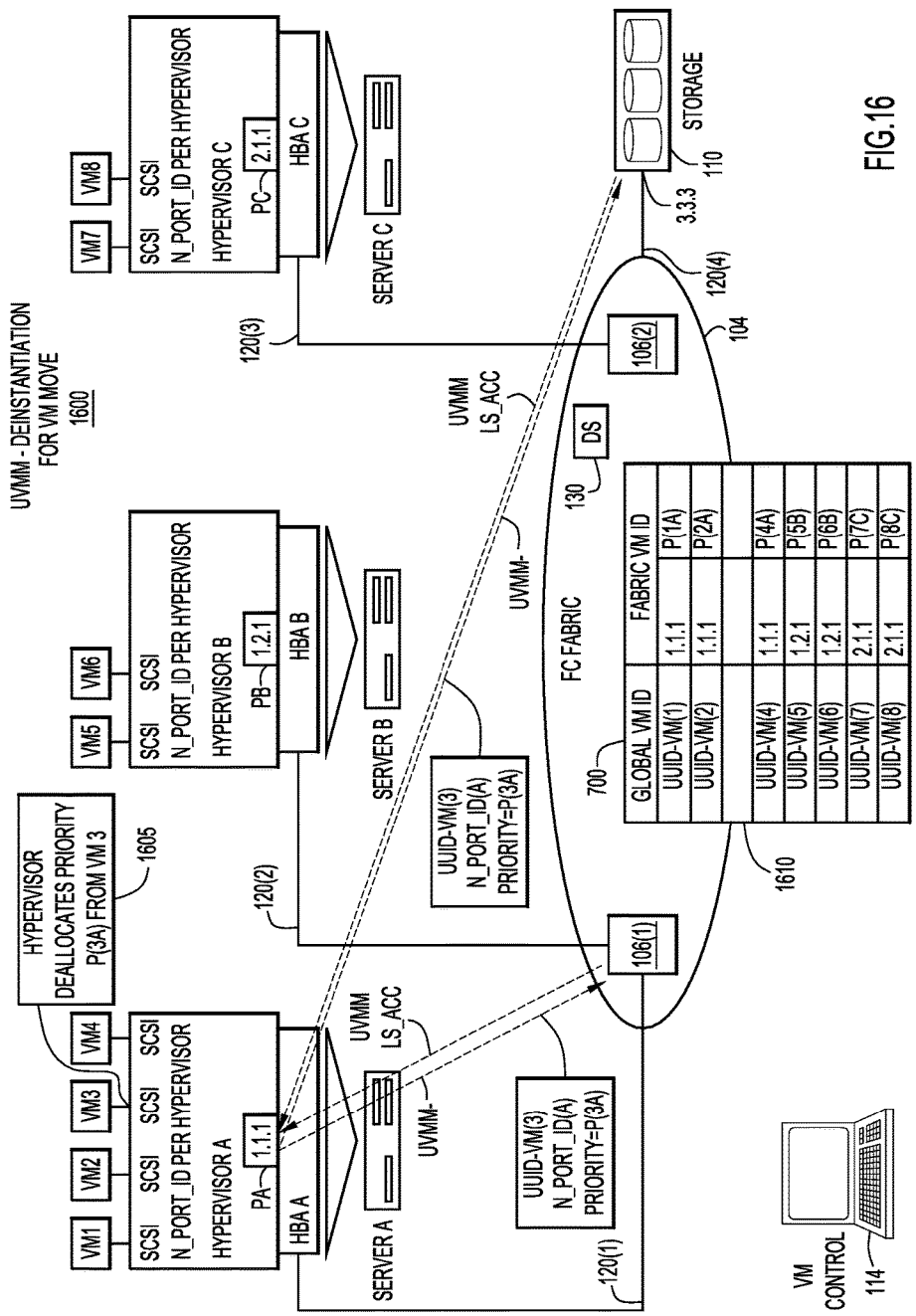
FIG. 16 is an illustration of an example scenario in which a VM is de-instantiated from the first Hypervisor in a move of the VM to the second Hypervisor, according to an example embodiment.

With reference to FIG. 16, there is an illustration of an example scenario 1600 in which VMs VM7 and VM8 are instantiated on Hypervisor C and VM VM3 is de-instantiated from Hypervisor A in a "VM move" of the VM to Hypervisor B. At 1605, Hypervisor A de-allocates VM ID P(3A) from VM VM3 and de-instantiates VM VM3 from the Hypervisor. Hypervisor A then sends a UVMM-ELS to fabric switch 106(1) and a UVMM-ELS to storage device 110 indicating the de-allocation of VM ID P(3A). In response, fabric switch 106(1) updates the information in the VM Identification server in Directory Service 130. The VM Identification server removes mapping entry 1610 (from mapping database 700) for VM ID P(3A) that was previously created responsive to a UVMM+ELS sent by Hypervisor A to fabric switch 106(1) when VM VM3 was previously instantiated on Hypervisor A.

Figure 17:
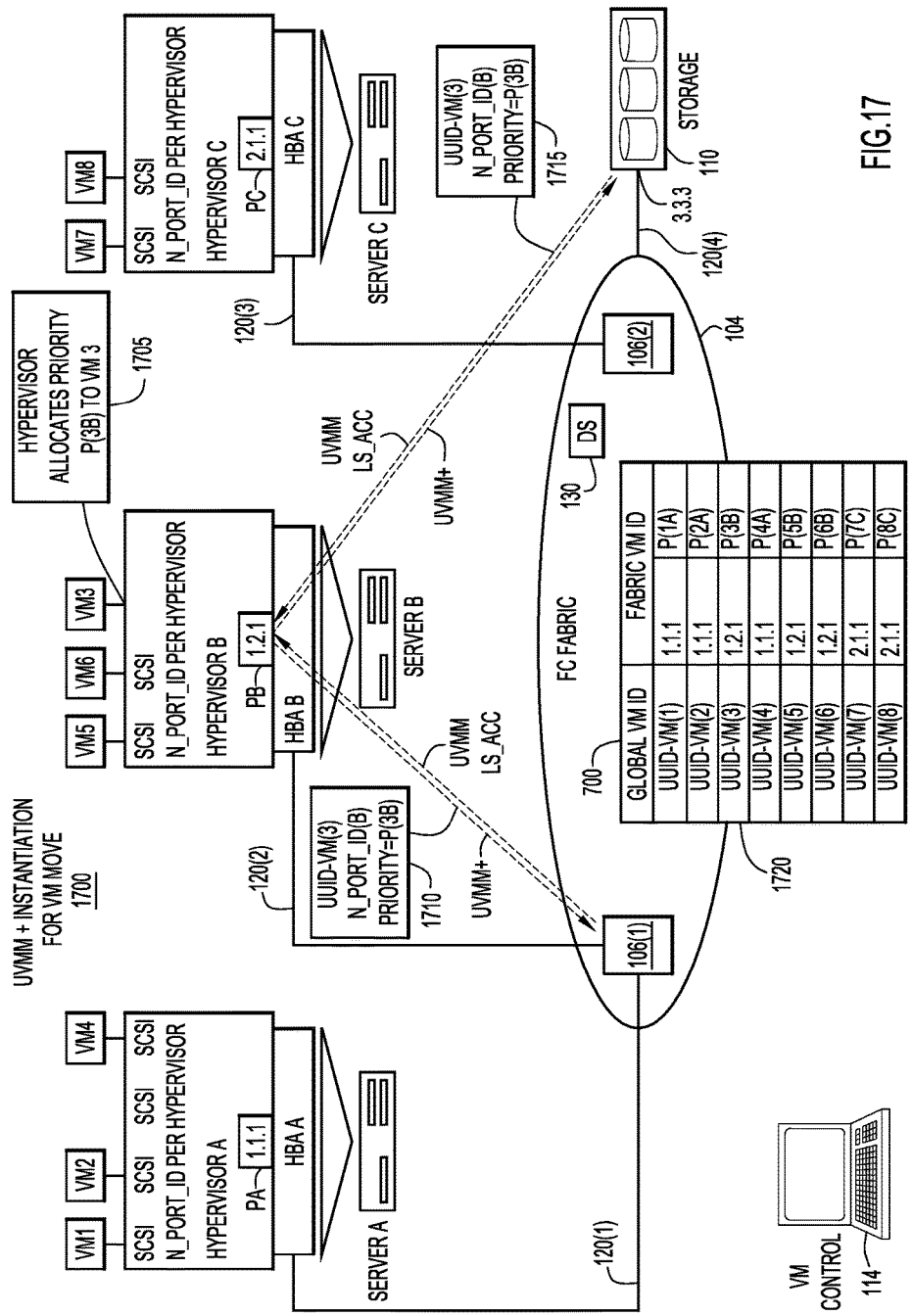
FIG. 17 is an illustration of a scenario in which the VM that was de-instantiated from the first Hypervisor in the scenario of FIG. 16 is instantiated on the second Hypervisor, according to an example embodiment.

With reference to FIG. 17, there is an illustration of an example scenario 1700 (that follows after example scenario 1700) in which VM VM3 is instantiated on Hypervisor B in the move of the VM from Hypervisor A to Hypervisor B. At 1705, Hypervisor B allocates priority value P(3B) as a local VM ID of VM3 and instantiates the VM on the Hypervisor. Hypervisor B sends a UVMM+ELS to fabric switch 106(1) and to storage device 110 to indicate instantiation of VM VM3 on the Hypervisor and the information indicated at 1710 and 1715. In response, switched fabric 104 updates mapping database 700 with mapping entry 1720 to reflect the move of VM VM3 to Hypervisor B.

Figure 18:
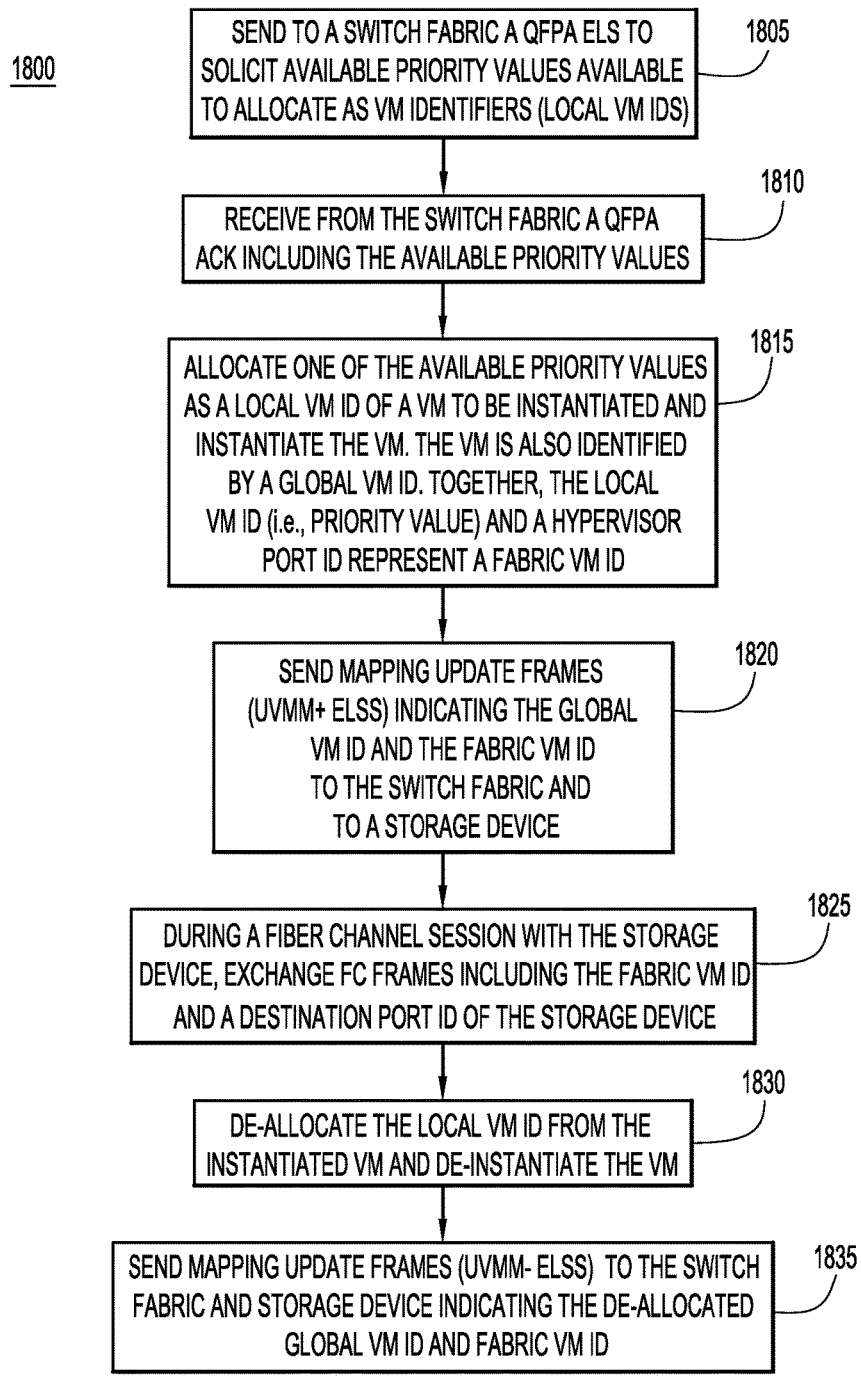
FIG. 18 is a flowchart of a VM aware FC method performed at a Hypervisor, according to an example embodiment.

With reference to FIG. 18, there is a flowchart of an example VM aware FC method 1800 performed at Hypervisor A. Other Hypervisors may perform method 1800.

At 1805, Hypervisor A sends to switched fabric 104 a QFPA ELS to query/solicit available priority values available to be allocated to VMs instantiated on the Hypervisor to identify the instantiated VMs locally to the Hypervisor.

At 1810, Hypervisor A receives from switched fabric 104 a QFPA LS_ACC including the available priority values.

At 1815, Hypervisor A allocates or assigns one of the available priority values (a local VM ID) to VM VM1 to be instantiated, and instantiates the VM. The allocated priority value identifies VM VM1 locally to Hypervisor A. The VM is also identified with a global VM ID (e.g., a VM UUID), which may be assigned to the VM by the Hypervisor in one embodiment. The {Hypervisor N_Port_ID, priority value (i.e. local VM ID)} pair represents a fabric VM ID of VM VM1.

At 1820, Hypervisor A sends UVMM+ELSs indicating the global VM ID (e.g., the VM UUID) and the fabric VM ID (i.e., the {Hypervisor N_Port_ID, local VM ID} pair) to switched fabric 104 and to storage device 110. In this way, Hypervisor A registers the global VM ID to fabric VM ID mapping associated with the instantiation of the VM with the VM Identification server of Director Service 130 and storage device 110 using the UVMM ELS.

At 1825, during a Fibre Channel session with storage device 110, Hypervisor A exchanges FC frames including the fabric VM ID (i.e., the {Hypervisor N_Port_ID, local VM ID} pair) and a destination N_Port_ID of storage device 110.

At 1830, Hypervisor A de-allocates the local VM ID (i.e., priority value) from VM VM1 and de-instantiates the VM. This may be for a move of the associated VM to another Hypervisor or to de-instantiate (or de-commission) the associated VM.

At 1835, Hypervisor A sends a UVMM-ELSs to switched fabric 104 and storage device 110 indicating the global VM ID (e.g., the VM UUID) and the fabric VM ID (i.e., the {Hypervisor N_Port_ID, local VM ID} pair). In this way, Hypervisor A de-registers the old mappings associated with the fabric VM ID from the VM Identification server and storage device 110. If a move is involved, the destination Hypervisor will re-register the VM thereon.

Figure 19:
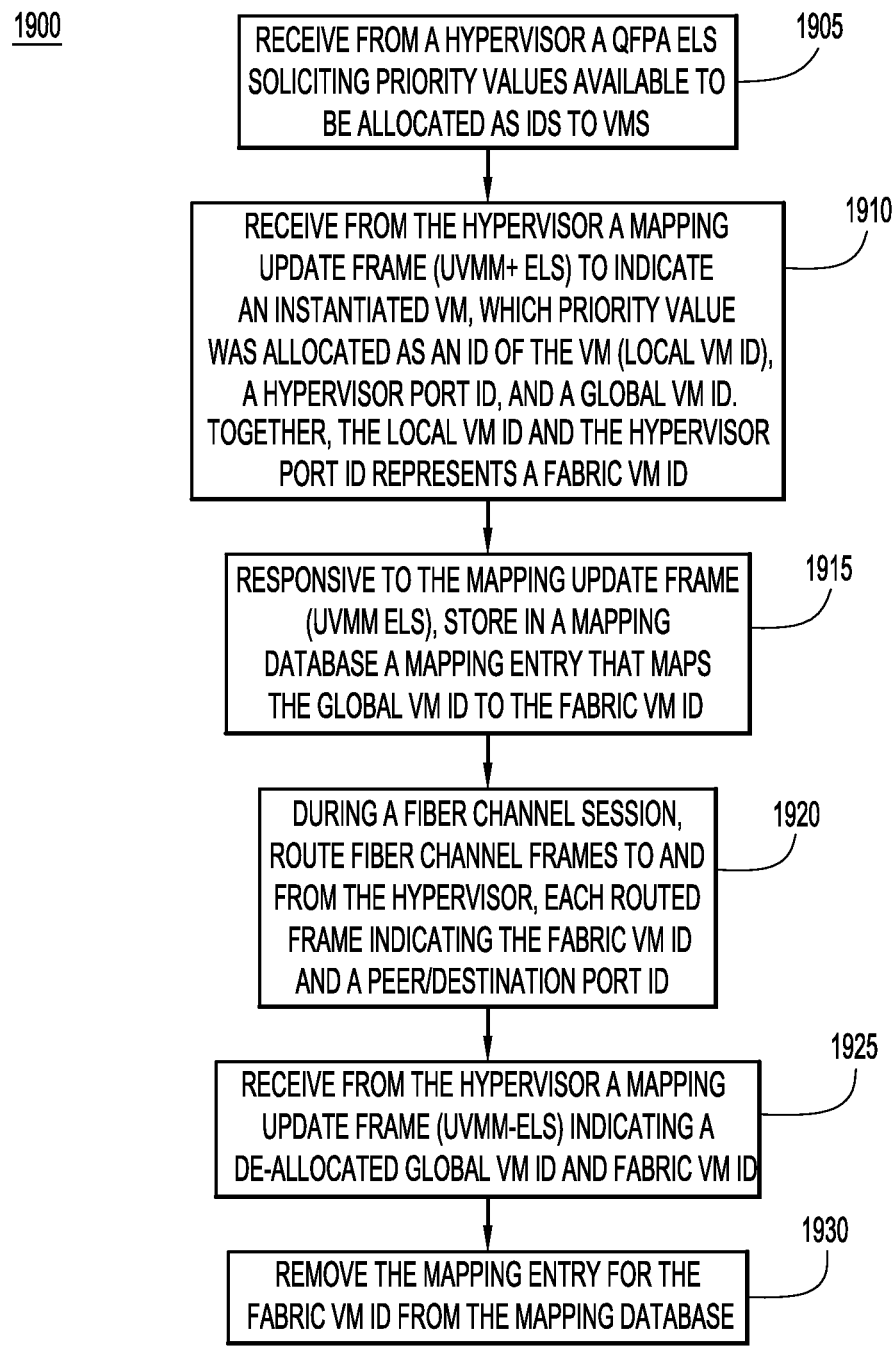
FIG. 19 is a flowchart of a VM aware FC method complementary to the method of FIG. 18 and that is performed at a fabric switch, according to an example embodiment.

With reference to FIG. 19, there is a flowchart of an example VM aware FC method 1900 complimentary to method 1800 that is performed at fabric switch 106(1). Other fabric switches may perform method 1900.

At 1905, fabric switch 106(1) receives from Hypervisor A the QFPA ELS querying priority values available to be allocated as local IDs to VMs.

At 1910, fabric switch 106(1) receives from Hypervisor A the UVMM+ELS to indicate the global VM ID (e.g., the VM UUID) of the instantiated VM VM1 and its fabric VM ID (i.e., the {Hypervisor N_Port_ID, priority value (i.e., local VM ID)} pair).

At 1915, responsive to the UVMM+ELS, fabric switch 106(1) causes the mapping database associated with the VM Identification server of Directory Service 130 to store a mapping entry that maps the global VM ID to the fabric VM ID.

At 1920, during a Fibre Channel session, fabric switch 106(1) routes Fibre Channel frames to and from Hypervisor A, each routed frame indicating the fabric VM ID (the Hypervisor N_Port_ID and the local VM ID) and a peer/destination N_Port_ID (e.g., of storage device 110).

At 1925, fabric switch 106(1) receives from Hypervisor A the UVMM-ELS indicating that VM VM1 was de-instantiated from the Hypervisor. The UVMM-ELS includes the global VM ID (e.g., the VM UUID) and the fabric VM ID (i.e., the {Hypervisor N_Port_ID, priority value} pair).

At 1930, fabric switch 106(1) causes removal of the mapping entry for the fabric VM ID from the mapping database.

Figure 20:
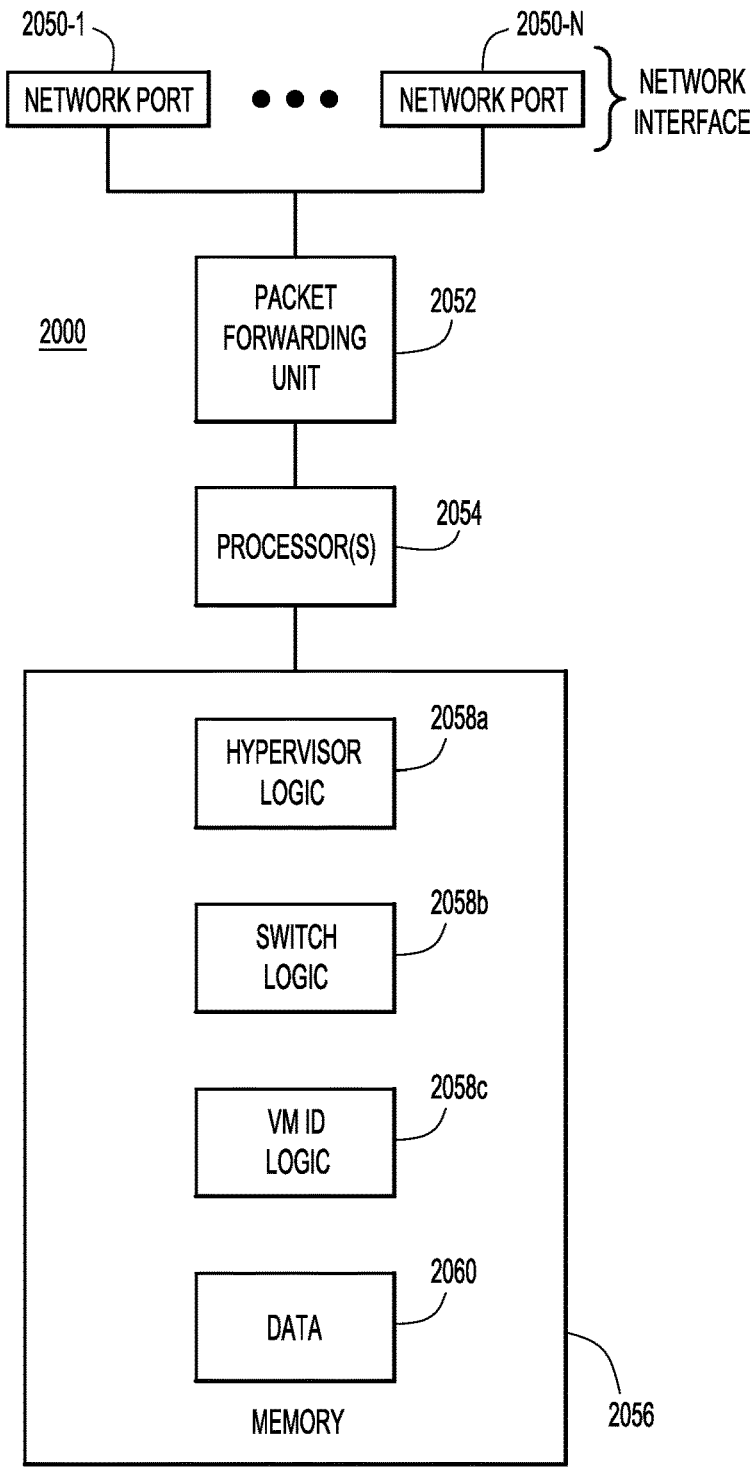
FIG. 20 is a block diagram of a computer device or system to implement embodiments presented herein.

With reference to FIG. 20, there is a block diagram of a computer device or system 2000 to implement embodiments presented herein. Computer device 2000 may be a network device, such as a fabric router or fabric switch (e.g., fabric switch 106(1)). Computer device 200 may also be a server to host a Hypervisor (e.g., server A, which hosts Hypervisor A), or a server to host the VM Identification Server in Directory Service 130. To this end, computer device 2000 may include a plurality of network ports 2050-1 through 2050-N (such as FC ports, e.g., F_Ports, N_Ports, and the like) or other form of network interface (also referred to as a "network interface unit"), a packet forwarding unit 2052 if the computer device is as switch or router, a processor 2054 (or multiple processors) and memory 2056. The memory stores instructions for implementing methods described herein.

The memory 2056 may comprise read only memory (ROM), random access memory (RAM), magnetic disk storage media devices, optical storage media devices, flash memory devices, electrical, optical, or other physical/tangible (non-transitory) memory storage devices. The processor 2054 is, for example, a microprocessor or a microcontroller that executes instructions stored in memory. Thus, in general, the memory 2056 may comprise one or more tangible computer readable storage media (e.g., a memory device) encoded with software comprising computer executable instructions and when the software is executed (by the processor 2054) it is operable to perform the operations described herein. Depending on the role of computer device 2000 in environment 100 (e.g., Hypervisor host, fabric switch, or VM Identification Service) memory 2056 may store Hypervisor logic 2058a to implement a Hypervisor configured to perform the Hypervisor operations described herein, switch logic 2058b to perform the fabric switch operations described herein, and VM Identification logic 2058c to perform VM Identification server operations described herein. The memory may also store data 2060 used and generated by logic 2058a-2058c, such as local VM IDs, information in mapping database 700, UVMM and QFPA ELS formats, and so on.

In summary, embodiments presented herein use the priority field in an FC frame header as a frame-by-frame VM ID. The embodiments define a new QFPA ELS to enable a Hypervisor to query a switched fabric about the priority values available to be allocated by the Hypervisor to identify VMs. An additional server, referred to as a VM Identification server under the Fibre Channel Directory Service, maintains mappings between global VM IDs and fabric VM IDs, so as to map the VM UUID to an {Hypervisor N_Port_ID, VM Priority} pair. The embodiments also define a new UVMM ELS to update the mappings.

Operation in the VM/switched fabric environment is improved by minimizing losses of FC frames during movements of VMs (i.e., VM movements) across Hypervisors because Hypervisors have visibility of input/output boundaries (i.e., exchanges). VM movements are minimally disruptive because Hypervisors are heavily involved and interactive with the movements, including updating the mappings in the VM Identification server. Storage devices are made aware of the VM movements using the UVMM ELSs. The switched fabric is made aware of the VM movements using the UVMM transactions.

Further advantages of the embodiments presented herein include:
  a. For a storage device, the ability to identify FC traffic on a per-VM basis.
  b. For the switched fabric, the ability to identify FC traffic on a per-VM basis.
  c. For the Hypervisor, the ability to define high priority and low priority VMs.
  d. The implementation is backward compatible.
  e. The implementation allows incremental deployment.
  f. VMs can be zoned by enhancing current zoning techniques, extending them to cover also Global IDs (e.g., UUIDs).
  g. The priority field allows a Hypervisor to identify many VMs, e.g., 127 VMs. If more are needed, the Hypervisor may acquire additional N_Port_IDs.

While embodiments described above are directed to a Fibre Channel environment, other embodiments are possible. For example, embodiments directed to a Fibre Channel over Ethernet (FCoE) are also possible. In an FCoE embodiment, the switched fabric 104 is an FCoE fabric, each switch device 106 is an FCoE switch device, and the ports (e.g., ports PA-PC) are FCoE ports.

In summary, in one form, a method is provided comprising: at a Hypervisor hosted on a computer device and configured with a Fibre Channel port to communicate with a Fibre Channel switch device in a Fibre Channel switched fabric, the Fibre Channel port having a port identifier assigned by the switch device: soliciting from the switch device Fibre Channel priority values available to be allocated as local identifiers to virtual machines (VMs) instantiated on the Hypervisor; instantiating on the Hypervisor a VM identified with a global VM identifier; allocating one of the solicited priority values to the instantiated VM such that the allocated priority value and the port identifier together represent a fabric VM identifier; after the allocating, sending to the switch device an update frame to indicate the instantiated VM, the global VM identifier, and the fabric VM identifier; and during a Fibre Channel session, exchanging Fibre Channel frames, each indicating the fabric VM identifier, with a Fibre Channel destination port connected to the switched fabric.

In another form, an apparatus is provided that implements the methods described above. For example, an apparatus is provided comprising: a processor configured to host a Hypervisor; and a fiber channel port configured to enable the Hypervisor to communicate with a Fibre Channel switch device in a Fibre Channel switched fabric, the Fibre Channel port having a port identifier assigned by the switch device, the Hypervisor configured to: solicit from the switch device Fibre Channel priority values available to be allocated as identifiers to virtual machines (VMs) instantiated on the Hypervisor; instantiate on the Hypervisor a VM identified with a global VM identifier; allocate one of the solicited priority values to the instantiated VM such that the allocated priority value and the port identifier together represent a fabric VM identifier; after the allocating, send to the switch device an update frame to indicate the instantiated VM, the global VM identifier, and the fabric VM identifier; and during a Fibre Channel session, exchange Fibre Channel frames, each indicating the fabric VM identifier, with a Fibre Channel destination port connected to the switched fabric.

In another form, a method is provided comprising: at a Fibre Channel switch device in a Fibre Channel switched fabric, the switch device configured to communicate with a computer hosted Hypervisor through a Fibre Channel port of the Hypervisor that has a port identifier assigned by the switch device: receiving from the Hypervisor a priority allocation request frame and responsive thereto sending to the Hypervisor an Accept that indicates priority values available to be allocated as identifiers to virtual machines (VMs) instantiated on the Hypervisor; receiving from the Hypervisor an update frame to indicate an instantiated VM, a global VM identifier of the VM, and a fabric VM identifier of the VM represented as a combination of one of the priority values allocated to the VM together with the port identifier; responsive to the update frame, storing in a mapping database accessible across the switched fabric an entry that maps the global VM identifier to the fabric VM identifier; and during a Fibre Channel session, routing Fibre Channel frames to and from the Hypervisor, each routed frame indicating the fabric VM identifier.

In yet another form, a non-transitory processor readable medium is provided. The processor readable medium stores instructions that, when executed by a processor, implement the methods described above and claimed below.

The above description is intended by way of example only.

What is claimed is:

1. A method comprising:
   at a Hypervisor hosted on a computer device and configured with a Fibre Channel port to communicate with a Fibre Channel switch device in a Fibre Channel switched fabric and a distributed computer server, the Fibre Channel port having a port identifier assigned by the switch device;
   soliciting from the switch device Fibre Channel priority values available to be allocated as local identifiers to virtual machines (VMs) instantiated on the Hypervisor, the soliciting including sending to the switch device a Fibre Channel priority allocation frame to solicit the priority values, and receiving from the switch device a Fibre Channel priority allocation frame acknowledgement that includes the solicited priority values;
   instantiating on the Hypervisor a VM identified with a global VM identifier;
   allocating one of the solicited priority values to the instantiated VM such that the allocated priority value and the port identifier together represent a fabric VM identifier;
   after the allocating, sending to the switch device an update frame to indicate the instantiated VM, the global VM identifier, and the fabric VM identifier;
   performing, at the Hypervisor, a port login (PLOGI) with the destination port to exchange session parameters with the destination port to be used during a Fibre Channel session; and
   during the Fibre Channel session, exchanging Fibre Channel frames, each indicating the fabric VM identifier, with a Fibre Channel destination port connected to the switched fabric.

2. The method of claim 1, further comprising:
   de-instantiating the instantiated VM from the Hypervisor; and
   sending to the switch device an update frame to indicate the de-instantiated VM, the global VM identifier, and the fabric VM identifier.

3. The method of claim 2, further comprising, at the switch device:
   receiving the update frame to indicate the instantiated VM and responsive thereto storing in a mapping database accessible across the switched fabric a mapping entry that maps the global VM identifier to the fabric VM identifier; and
   receiving the update frame to indicate the de-instantiated VM and responsive thereto removing the mapping entry from the mapping databases.

4. The method of claim 2, wherein the solicited priority values are divided among priority groups each associated with a respective Quality of Service (QoS) priority level, and wherein each priority group includes multiple ones of the priority values that share the respective QoS priority level for that group.

5. The method of claim 2, further comprising, at the Hypervisor, prior to the exchanging:
   responsive to the instantiating and allocating, sending to the destination port through the switch device an update frame to indicate the instantiated VM, the global VM identifier, and the fabric VM identifier,
   wherein the exchanging includes sending Fibre Channel frames to and receiving Fibre Channel session frames from the destination port through the switched fabric, each sent and received Fibre Channel frame including the fabric VM identifier and a port identifier of the destination port.

6. The method of claim 2, further comprising:
   responsive to the de-instantiating, sending to the destination port through the switch fabric an update message to indicate the de-instantiated VM, the global VM identifier, and the fabric VM identifier.

7. The method of claim 1, further comprising, at the switch device:
   causing the switched fabric to store in a mapping database a mapping entry that maps the global VM identifier to the fabric VM identifier.

8. The method of claim 1, wherein the Fibre Channel port is a Fibre Channel over Ethernet (FCoE) port, the Fibre Channel switch device is an FCoE switch device, and the Fibre Channel switched fabric is an FCoE switched fabric.

9. The method of claim 1, wherein the Fibre Channel priority allocation frame further includes flags to indicate which of the solicited priority values included in the Fibre Channel priority allocation frame are available and are not available to be allocated as local identifiers of VMs.

10. The method of claim 1, wherein:
    the Fibre Channel priority allocation frame to solicit the priority values and the Fibre Channel priority application acknowledgement frame are Fibre Channel control plane messages; and
    the exchanging Fibre Channel frames includes exchanging Fibre Channel data frames.

11. An apparatus comprising:
    a processor configured to host a Hypervisor; and
    a fiber channel port configured to enable the Hypervisor to communicate with a Fibre Channel switch device in a Fibre Channel switched fabric and a distributed computer server, the Fibre Channel port having a port identifier assigned by the switch device, the Hypervisor configured to:
    solicit from the switch device Fibre Channel priority values available to be allocated as identifiers to virtual machines (VMs) instantiated on the Hypervisor, by sending to the switch device a Fibre Channel priority allocation frame to solicit the priority values, and receiving from the switch device a Fibre Channel priority allocation frame acknowledgement that includes the solicited priority;
    instantiate on the Hypervisor a VM identified with a global VM identifier;
    allocate one of the solicited priority values to the instantiated VM such that the allocated priority value and the port identifier together represent a fabric VM identifier;
    after the allocating, send to the switch device an update frame to indicate the instantiated VM, the global VM identifier, and the fabric VM identifier;
    performing, at the Hypervisor, a port login (PLOGI) with the destination port to exchange session parameters with the destination port to be used during a Fibre Channel session; and
    during the Fibre Channel session, exchange Fibre Channel frames, each indicating the fabric VM identifier, with a Fibre Channel destination port connected to the switched fabric.

12. The apparatus of claim 11, wherein the Hypervisor is further configured to:
de-instantiate the instantiated VM from the Hypervisor; and
send to the switch device an update frame to indicate the de-instantiated VM, the global VM identifier, and the fabric VM identifier.

13. The apparatus of claim 12, wherein the solicited priority values are divided among priority groups each associated with a respective Quality of Service (QoS) priority level, and wherein each priority group includes multiple ones of the priority values that share the respective QoS priority level for that group.

14. The apparatus of claim 12, wherein the Hypervisor is further configured to, prior to the exchange:
responsive to the instantiating and allocating, send to the destination port through the switch device an update frame to indicate the instantiated VM, the global VM identifier, and the fabric VM identifier,
wherein the exchange includes sending Fibre Channel frames to and receiving Fibre Channel session frames from the destination port through the switched fabric, each sent and received Fibre Channel frame including the fabric VM identifier and a port identifier of the destination port.

15. The apparatus of claim 12, wherein the Hypervisor is further configured to:
responsive to the de-instantiating, send to the destination port through the switched fabric an update message to indicate the de-instantiated VM, the global VM identifier, and the fabric VM identifier.

16. The apparatus of claim 11, wherein the Fibre Channel priority allocation frame further includes flags to indicate which of the solicited priority values included in the Fibre Channel priority allocation frame are available and are not available to be allocated as local identifiers of VMs.

17. Non-transitory computer readable media encoded with instruction that, when executed by a processor of a computer device hosting a Hypervisor and configured with a Fibre Channel port to communicate with a Fibre Channel switch device in a Fibre Channel switched fabric and a distributed computer server, the Fibre Channel port having a port identifier assigned by the switch device, cause the processor to perform:
soliciting from the switch device Fibre Channel priority values available to be allocated as local identifiers to virtual machines (VMs) instantiated on the Hypervisor, the soliciting including sending to the switch device a Fibre Channel priority allocation frame to solicit the priority values, and receiving from the switch device a Fibre Channel priority allocation frame acknowledgement that includes the solicited priority values;
instantiating on the Hypervisor a VM identified with a global VM identifier;
allocating one of the solicited priority values to the instantiated VM such that the allocated priority value and the port identifier together represent a fabric VM identifier;
after the allocating, sending to the switch device an update frame to indicate the instantiated VM, the global VM identifier, and the fabric VM identifier;
performing, at the Hypervisor, a port login (PLOGI) with the destination port to exchange session parameters with the destination port to be used during a Fibre Channel session; and
during the Fibre Channel session, exchanging Fibre Channel frames, each indicating the fabric VM identifier, with a Fibre Channel destination port connected to the switched fabric.

18. The non-transitory computer readable media of claim 17, further comprising instructions to cause the processor to perform:
de-instantiating the instantiated VM from the Hypervisor; and
sending to the switch device an update frame to indicate the de-instantiated VM, the global VM identifier, and the fabric VM identifier.

19. The non-transitory computer readable media of claim 18, wherein the solicited priority values are divided among priority groups each associated with a respective Quality of Service (QoS) priority level, and wherein each priority group includes multiple ones of the priority values that share the respective QoS priority level for that group.

20. The non-transitory computer readable media of claim 18, further comprising instructions to cause a processor to perform, at the Hypervisor, prior to the exchanging:
responsive to the instantiating and allocating, sending to the destination port through the switch device an update frame to indicate the instantiated VM, the global VM identifier, and the fabric VM identifier,
wherein the exchanging includes sending Fibre Channel frames to and receiving Fibre Channel session frames from the destination port through the switched fabric, each sent and received Fibre Channel frame including the fabric VM identifier and a port identifier of the destination port.

21. The non-transitory computer readable media of claim 18, further comprising instructions to cause the processor to perform:
responsive to the de-instantiating, sending to the destination port through the switched fabric an update message to indicate the de-instantiated VM, the global VM identifier, and the fabric VM identifier.

22. The non-transitory computer readable media of claim 17, wherein the Fibre Channel port is a Fibre Channel over Ethernet (FCoE) port, the Fibre Channel switch device is an FCoE switch device, and the Fibre Channel switched fabric is an FCoE switched fabric.

* * * * *

UNITED STATES PATENT AND TRADEMARK OFFICE
CERTIFICATE OF CORRECTION

| | |
|---|---|
| PATENT NO. | : 10,055,241 B1 |
| APPLICATION NO. | : 14/845628 |
| DATED | : August 21, 2018 |
| INVENTOR(S) | : Claudio DeSanti |

It is certified that error appears in the above-identified patent and that said Letters Patent is hereby corrected as shown below:

In the Claims

Claim 1, Column 13, Line 16, please replace ";" with --:--

Signed and Sealed this
Twenty-ninth Day of January, 2019

Andrei Iancu
*Director of the United States Patent and Trademark Office*